United States Patent
Ijichi

(10) Patent No.: US 6,388,961 B1
(45) Date of Patent: May 14, 2002

(54) RECORDING APPARATUS, PLAYBACK APPARATUS, RECORDING METHOD, AND PLAYBACK METHOD

(75) Inventor: Susumu Ijichi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/576,935

(22) Filed: May 22, 2000

(30) Foreign Application Priority Data

May 21, 1999 (JP) .......................................... 11-141582

(51) Int. Cl.$^7$ .............................................. G11B 17/22
(52) U.S. Cl. .................................. 369/30.36; 369/30.24
(58) Field of Search .......................... 369/30.36, 30.24, 369/30.21, 30.22, 47.22, 47.3, 47.44

(56) References Cited

U.S. PATENT DOCUMENTS

| | | | | |
|---|---|---|---|---|
| 4,841,505 A | * | 6/1989 | Aoyagi .......................... | 369/32 |
| 4,878,129 A | * | 10/1989 | Yasuda et al. ............... | 386/125 |
| 5,122,999 A | * | 6/1992 | Kimura et al. ................. | 369/32 |
| 5,365,502 A | | 11/1994 | Misono ......................... | 369/18 |
| 5,463,601 A | * | 10/1995 | Yanagisawa .................. | 369/32 |
| 5,471,442 A | * | 11/1995 | Shimizume et al. ........... | 369/32 |
| 5,761,519 A | * | 6/1998 | Wada et al. .................. | 713/330 |
| 5,831,946 A | * | 11/1998 | Bie ............................... | 369/33 |
| 5,974,008 A | * | 10/1999 | Lee ............................... | 369/33 |
| 6,188,650 B1 | * | 2/2001 | Hamada et al. ............... | 369/33 |

FOREIGN PATENT DOCUMENTS

| | | |
|---|---|---|
| EP | 0596139 | 5/1994 |
| JP | 8124359 | 5/1996 |
| JP | 0097766 | 4/1998 |

* cited by examiner

*Primary Examiner*—Tan Dinh
(74) *Attorney, Agent, or Firm*—Jay H. Maioli

(57) ABSTRACT

When a stopping instruction is given while a data file recorded in a recording medium is being played back, the position of the recording medium at which the stopping instruction was given is recorded so that a playback is started from the recorded position during a resume playback. Also, in a case where a data file is recorded in a recording medium, the recording position of a predetermined recorded data file is stored so that a playback is started from the predetermined position of the predetermined recorded data file during a playback.

30 Claims, 12 Drawing Sheets

RECORDING

NEXT PLAYBACK AT RESUME-OFF

NEXT PLAYBACK AT RESUME-ON

NEXT PLAYBACK AT RESUME-TRACK-ON

RECORDING APPARATUS, PLAYBACK APPARATUS, RECORDING METHOD, AND PLAYBACK METHOD

BACKGROUND OF THE INVENTION

1. Field of the Invention

The present invention relates to a playback apparatus and a playback method which are capable of varying, by the setting by a user, a resumption of playback method for a recording medium in which a plurality of data files and management information for managing the data files are recorded, and also relates to a recording and playback apparatus and a recording and playback method which are capable of varying, by the setting by a user, a data file which is played back after the data file is recorded in a recording medium in which a plurality of data files and management information for managing the data files can be recorded, and a playback start position in the data file.

2. Description of the Related Art

In recent years, small recording media having incorporated therein, for example, a solid-state storage device, such as a flash memory, have been made, and dedicated drive units or drive units which are incorporated into an audio/video apparatus, an information apparatus, etc., have been developed so that computer data, still image data, moving image data, music data, audio data, etc., can be stored. As media for recording music data, media, such as CDs (compact discs), MDs (Mini Disks) (trademark), are conventionally in common use, and recording and playback are possible by a CD player and an MD recorder/player.

In a system in which, for example, a CD or an MD is used, music data is recorded by forming one piece of music in one track, and further, management information called a TOC (Table of Contents) is recorded on that medium, and thereby management is made so that tracks can be sequentially played back in a predetermined sequence. Normally, a track number is assigned to each track, and in the TOC, the address of a recording position is managed for each track number. In the playback apparatus, by referring to the TOC, each track is played back in the sequence of track numbers.

Normally, when a user performs a playback operation, tracks are sequentially played back from the starting track number. That is, the playback start position is the start position which is a starting address of the start track in which the track number is 1.

However, for a playback of a program, etc., there are cases in which a user may want to temporarily stop a playback in the middle of a piece of music and thereafter, to start the playback from that stopped position. For this reason, in a conventional CD player or an MD player, in what is commonly called a "resume function", the following function is added such that when a playback operation is performed, a playback is started from the position at which the playback was stopped previously.

This resume function improves the ease of use for users, and for a playback operation, there has been a demand for further ease of use to meet demands of users. For example, there is also a demand for users, after playback is stopped in the middle of a particular piece of music, to play back a piece of music from the start position of that piece of music rather than from a position at which it was stopped. Also, there is a demand for a piece of music, after recording is performed, to be played back from the track which is recorded or from the start of that piece of music. of course, in addition to this, there often occurs a case in which, during playback, it is desired to perform a playback from the position related to a playback or recording (or sound recording) operation immediately before it.

However, in order for a user to perform a playback from a desired playback start position, which cannot be realized by a conventional resume function in a manner as described above, it is necessary to select a track number or to perform FF (Fast Forward) or REW (Rewinding) after a playback operation, and this is complicated.

SUMMARY OF THE INVENTION

An object of the present invention is to perform a playback, when resuming a playback, from a position at which a data file is recorded in a recording medium was stopped by recording the position of the recording medium at which stopping was instructed in a case where stopping of the data file was instructed while the data file recorded in the recording medium was being played back.

Another object of the present invention is to start a playback, at the time of a playback, from a predetermined position of a predetermined recorded data file by storing a recording position of the predetermined recording data file in a case where a data file is recorded in a recording medium.

To achieve the above-mentioned objects, according to a first aspect of the present invention, there is provided a playback apparatus for performing a resume playback which resumes a playback from a predetermined position of a predetermined data file of a storage medium in which one or plural data files are managed in accordance with management information, the playback apparatus comprising: playback means for playing back a data file stored in the storage medium; operation means by which a user selects and sets a predetermined resume mode from a plurality of resume modes, each of which instructs a playback start from a different playback start position in accordance with a playback starting instruction after a playback is stopped; storage means for storing playback start position information on a recording medium, which information corresponding to a predetermined resume mode which is set by the operation means; and control means for controlling the playback means so that a playback is started from a predetermined position of a predetermined data file on the basis of the resume mode which is selected and set by the operation means from among a plurality of resume modes, resume start position information stored in the storage means, and the management information.

According to a second aspect of the present invention, there is provided a recording and playback apparatus for performing a resume playback such that a data file is recorded in a recording medium in which a plurality of data files can be recorded together with management information, and a playback is started from a predetermined position of a predetermined data file after the data file is recorded in the recording medium, the recording and playback apparatus comprising: recording means for recording a data file in the recording medium; operation means by which a user selects a predetermined resume mode from a plurality of resume modes, each of which instructs starting of a playback from a different playback start position in accordance with a playback start instruction after the recording is terminated; storage means for storing at least a part of management information of a data file which is recorded in the recording medium; playback means for playing back a data file which is recorded in the recording medium; and control means for controlling the playback means in such a way that control is performed so that a data file is recorded in the recording medium by the recording means, a part of management information for the recorded data file is stored in the storage means on the basis of a resume mode which is set by the operation means and thereafter, a resume playback is performed from a predetermined position of a predetermined data file on the basis of the management information stored in the storage means and the resume mode which is set by the operation means.

According to a third aspect of the present invention, there is provided a playback method for performing a resume playback which starts a playback from a predetermined position of a predetermined data file on the basis of a stored content of storage means for storing playback start position information regarding the position at which a playback is started from a recording medium in which one or plural data files are managed and stored in accordance with management information, the playback method comprising the steps of: selecting a predetermined resume mode in accordance with instructions from a user from a plurality of resume modes, each of which starts a playback from a different playback start position in accordance with a playback start instruction after the playback is stopped; and reading and playing back a data file from a predetermined position of a predetermined data file on the basis of a resume mode which is selected from the plurality of resume modes, playback start position information stored in the storage means, and the management information.

According to a fourth aspect of the present invention, there is provided a recording and playback method for performing a resume playback such that a data file is recorded in a recording medium in which a plurality of data files can be recorded together with management information, and a playback is performed from a predetermined position in a predetermined data file on the basis of the contents of storage means in which a part of the management information is stored after the data file is recorded in the recording medium, the recording and playback method comprising: a selection step for selecting a predetermined resume mode in accordance with instructions from a user from among a plurality of resume modes, each of which instructs starting of a playback from a different playback start position in accordance with a playback start instruction after the recording is stopped; a recording step for recording an input data file in the recording medium; a storing step for storing, in the storage means, a part of management information for managing data files which are recorded in the recording medium; and a playback step for playing back a data file from the recording medium in such a way that a resume playback is performed from a predetermined position of a predetermined data file on the basis of a part of the management information stored in the storage means and the resume mode selected from among the plurality of resume modes.

The above and further objects, aspects and novel features of the invention will become more fully apparent from the following detailed description when read in conjunction with the accompanying drawings.

DESCRIPTION OF THE PREFERRED EMBODIMENTS

Preferred embodiments of the present invention will be described below. In these embodiments, a plate-shaped memory having an exterior shape of a plate is used as an example of a recording medium, and a drive unit capable of recording and playing back data is used as an example of a playback apparatus of the present invention.

The description is given in the following sequence.

Figure 1:
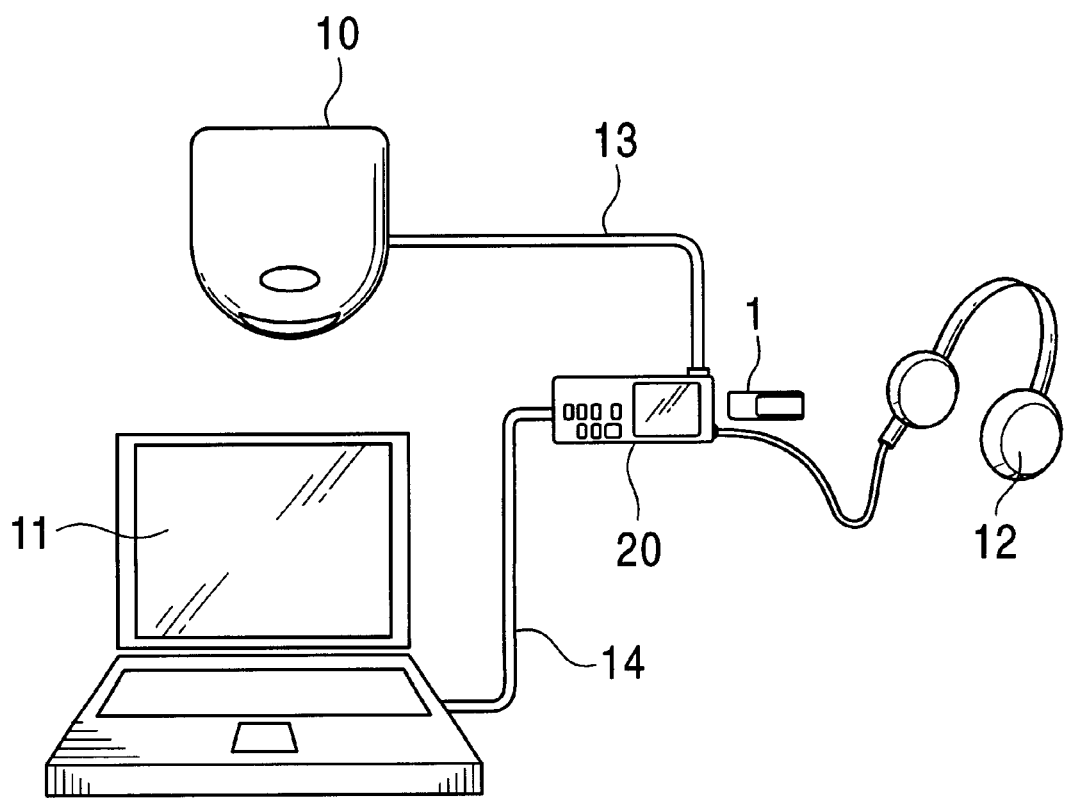
FIG. 1 is an illustration of an example of the connection of a system, including a drive unit, according to an embodiment of the present invention.

1. Example of connection of system
2. Plate-shaped memory
3. Construction of drive unit
4. File structure in the plate-shaped memory
5. Playback operation in various resume mode states
6. Resume setting process
7. Playback process
8. Recording process
9. Modification 1. Example of Connection of System FIG. 1 shows an example of connection of various types of apparatuses for a drive unit 20 of this example.

As a result of loading a plate-shaped memory 1 into a drive unit 20, the drive unit 20 can perform recording and playback of data to and from the plate-shaped memory 1. For example, in a case where the plate-shaped memory 1 having recorded therein music data is loaded, it is possible to enjoy a playback of that piece of music which is a program by connecting a headphone 12. Also, by connecting a CD player 10 as an external playback apparatus through a cable 13, it is possible to obtain a playback audio signal from the CD player 10 and to record it in the plate-shaped memory 1.

Also, by connection with an information apparatus, such as a personal computer 11, through, for example, a USB (Universal Serial Bus) cable 14, data supplied from the personal computer 11 can be recorded in the plate-shaped memory 1, and data played back from the plate-shaped memory 1 can be transferred to the personal computer 11.

Furthermore, although not shown in the figures, it is also possible to record, in the plate-shaped memory 1, audio picked up through connection with a microphone or it is possible to connect a recording apparatus, such as an MD recorder, so as to supply data and thus to record the data in a recording medium which is loaded into the recording apparatus.

In the manner as described above, by connecting various types of apparatuses, it is possible for the drive unit 20 to perform recording and playback in a state most appropriate for carrying, or possible to perform a system operation by connection with an apparatus disposed in a house or in a work place. Also, for example, the drive unit 20 of this example has a display section, thereby making it possible to play back document data, image data, etc. recorded in the plate-shaped memory 1 by the single unit of the drive unit 20.

Furthermore, although not provided in the construction of the drive unit 20 of this example (to be described later), if a built-in microphone and a built-in speaker are provided, it is possible for the single unit of the drive unit 20 to perform playback or recording of music, audio, and moving images from the plate-shaped memory 1.

2. Plate-shaped Memory

With reference to FIGS. 2A, 2B, 2C, and 2D, the exterior shape of the plate-shaped memory 1, which is a recording medium used in this example, is described below.

The plate-shaped memory 1 has a memory device having a predetermined storage capacity inside a plate-shaped housing, such as that shown in, for example, FIGS. 2A, 2B, 2C, and 2D. In this example, a flash memory is used as this memory device.

Figure 2A:
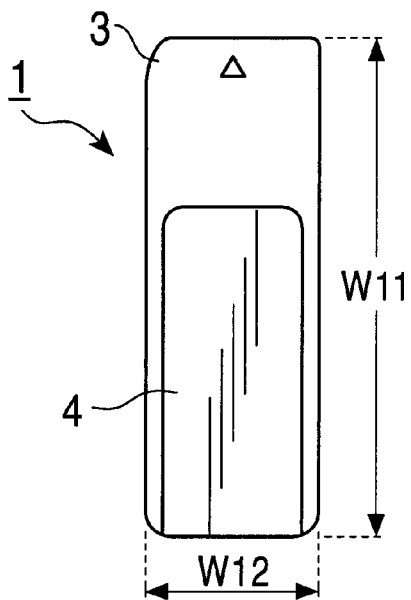
FIG. 2A is a plan view showing the exterior shape of a plate-shaped memory according to the embodiment of the present invention.
Figure 2B:
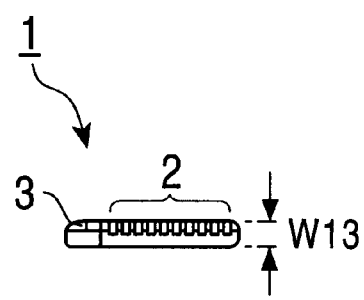
FIG. 2B is a front view showing the exterior shape of the plate-shaped memory according to the embodiment of the present invention.
Figure 2C:
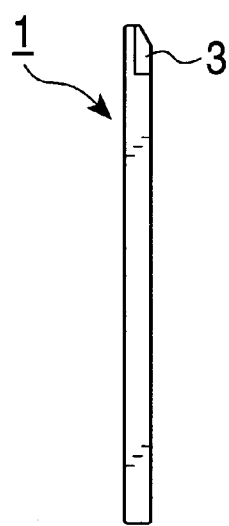
FIG. 2C is a side view showing the exterior shape of the plate-shaped memory according to the embodiment of the present invention.
Figure 2D:
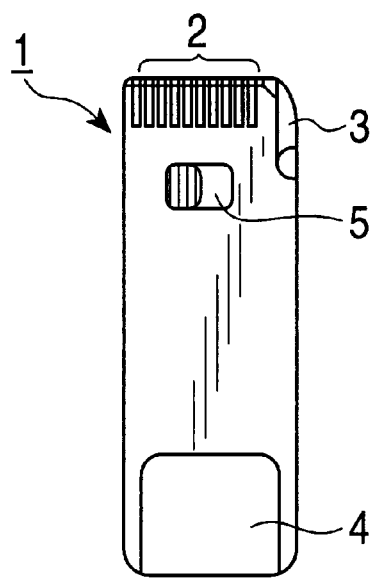
FIG. 2D is a bottom view showing the exterior shape of the plate-shaped memory according to the embodiment of the present invention.

The housing shown as a plan view in FIG. 2A, as a front view in FIG. 2B, as a side view in FIG. 2C, and as a bottom view in FIG. 2D is formed by, for example, a plastic mold. As specific examples of the size, the widths W11, W12, and W13 shown in FIGS. 12 and 13 are W11=60 mm, W12=20 mm, and W13=2.8 mm.

A terminal section 2 having, for example, 10 electrodes is formed from the front lower portion of the housing to the bottom side thereof. A reading or writing operation from and to an internal memory device is performed from this terminal section 2. The left upper portion of the housing along the flat surface of the housing is a cutout section 3. This cutout section 3 prevents this plate-shaped memory 1 from being erroneously inserted when this is loaded into, for example, a detachable mechanism on the main unit side of the drive unit. Also, a label attachment surface 4 is formed from the upper surface of the housing to the bottom side thereof so that a user can paste a label on which the stored contents are indicated in writing. Furthermore, a slide switch 5 for the purpose of preventing an accidental erasure of the recorded content is formed on the bottom side.

In such a plate-shaped memory 1, it is specified that the flash memory capacity is one of 4 MB (megabytes), 8 MB, 16 MB, 32 MB, 64 MB, and 128 MB. Also, as a file system for data recording/playback, what is commonly called a FAT (File Allocation Table) system is used.

The writing speed is 1500 Kbytes/sec to 330 Kbytes/sec, the reading speed is 2.45 megabytes/sec, the writing unit is at 512 bytes, and the erasure block size is 8 KB or 16 KB. Also, the power-supply voltage Vcc is 2.7 to 3.6 V, and the serial clock SCLK is 20 MHz at maximum.

3. Construction of Drive Unit

Figure 3A:
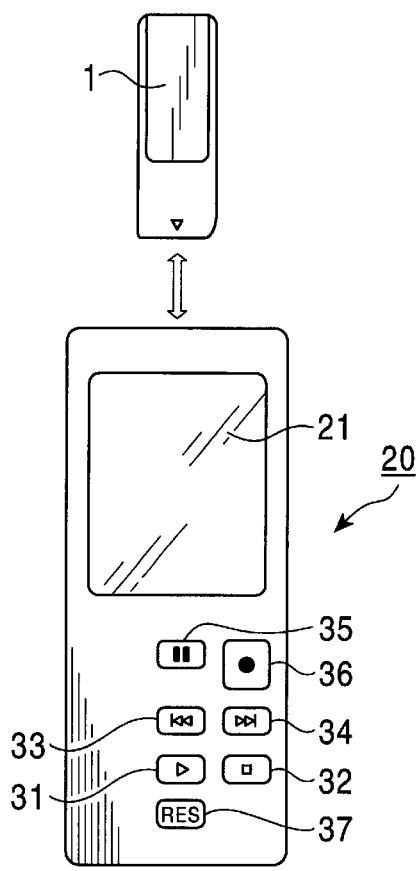
FIG. 3A is a plan view showing an example of the exterior shape of a drive unit according to the embodiment of the present invention.

Referring to FIGS. 3A, 3B, 3C, and 3D, and FIG. 4, the construction of the drive unit 20 of this example will be described below. FIGS. 3A, 3B, 3C, and 3D are a plan view, a top view, a left side view, and a bottom view, respectively, showing an example of the exterior of the drive unit 20. The plate-shaped memory 1 is loaded into a detachable mechanism 22 formed on the top side of the apparatus, as shown in FIG. 3A.

In this drive unit 20, a display section 21, for example, having a liquid-crystal panel is formed on the flat surface thereof, so that reproduced images and characters, or information associated with audio and music to be played back, and guidance messages for operation, etc., are displayed on the display section 21.

Figure 3B:
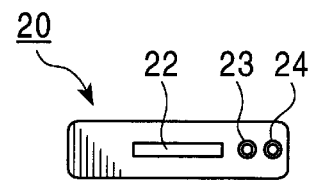
FIG. 3B is a left side view showing an example of the exterior shape of the drive unit according to the embodiment of the present invention.

Also, for the purpose of connection with various types of apparatuses as shown in FIG. 1, various types of terminals are formed. For example, as shown in FIG. 3B, a headphone terminal 23 and a line output terminal 24 are formed on the top side. As a result of the headphone 12 being connected to the headphone terminal 23 as shown in FIG. 1, a playback audio signal is supplied to the headphone 12, and a user can listen to the played-back audio.

Also, by connecting an external apparatus to the line output terminal 24 through an audio cable, a playback audio signal can be supplied to the external apparatus. For example, as a result of connection with an audio amplifier, it becomes possible to listen to music/audio played back from the plate-shaped memory 1 through a speaker system, or as a result of connection with a mini-disk recorder or a tape recorder, it is possible to dub and record music/audio played back from the plate-shaped memory 1 in another medium.

Figure 3C:
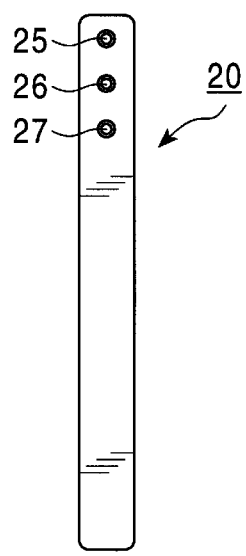
FIG. 3C is a top view showing an example of the exterior shape of the drive unit according to the embodiment of the present invention.

As shown in FIG. 3C, for example, a microphone input terminal 25, a line input terminal 26, a digital input terminal 27, etc., are formed on the side of the drive unit 20. As a result of connection of a microphone to the microphone input terminal 25, it is possible for the drive unit 20 to obtain an audio signal picked up by a microphone and to record it in, for example, a plate-shaped memory 1. Also, by connecting an external apparatus, such as the CD player 10, to the line input terminal 26 as shown in FIG. 1, it is possible to obtain an audio signal supplied from the external apparatus and to record it in, for example, a plate-shaped memory 1. Furthermore, it is also possible for the digital input terminal 27 to input digital audio data transmitted through an optical cable. For example, if the external CD player is a digital-output-compatible apparatus, what is commonly called "digital dubbing" is also possible by connecting the external CD player through an optical cable.

Figure 3D:
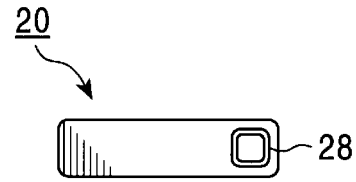
FIG. 3D is a bottom view showing an example of the exterior shape of the drive unit according to the embodiment of the present invention.

As shown in FIG. 3D, for example, on the bottom side of the drive unit 20, a USB connector 28 is formed so that various types of communications and data transmission become possible to and from a USB-compatible apparatus, for example, a personal computer having a USB interface.

The types and the number of these terminals are merely examples, and other examples are possible. For example, an optical-cable-compatible digital output terminal may be provided, or a SCSI (Small Computer System Interface) connector, a serial port, an RS232C connector, an IEEE 1394 connector, etc., may be formed. Since the terminal construction is well known, it will not be described. The headphone terminal 23 and the line output terminal 24 may be shared as one terminal, and furthermore, a digital output terminal may be shared therewith. In a similar manner, the microphone input terminal 25, the line input terminal 26, and the digital input terminal 27 may also be shared as one terminal.

In this drive unit 20, as operation elements used by the user, for example, a playback key 31, a stop key 32, a REW (and AMS) key 33 (rewinding/locating the start), an FF (and AMS) key 34 (fast forward/locating the start), a pause key 35, a record key 36, etc., are provided. These operation keys are suitable for recording and playback operations for, in particular, audio/music data and movingimage data and, of course, are merely examples. For example, in addition to these, operation elements, such as cursor movement keys, numeric keys, an operation dial, etc., may be provided.

In the case of this example, a resume key 37 is provided for operations relating to a resume mode (to be described later). A process corresponding to the operation of this resume key 37 will be described later.

Although a power-on key and a power-off key are not shown, if, for example, the playback key 31 is also used as a power-on key and after the operation of the stop key 32, the power supply is switched off after an elapse of a predetermined time, the power-on key may be omitted. Of course, the power-on key may be provided.

Various numbers of and types of operation keys may be disposed. In this example, only the operation keys shown in FIG. 3A make possible an operation for recording and playback, including a resumption of operation (to be described later), thereby reducing the number of keys, and realizing a reduction in size and a lower cost of the apparatus due to the reduction in the number of keys.

Figure 4:
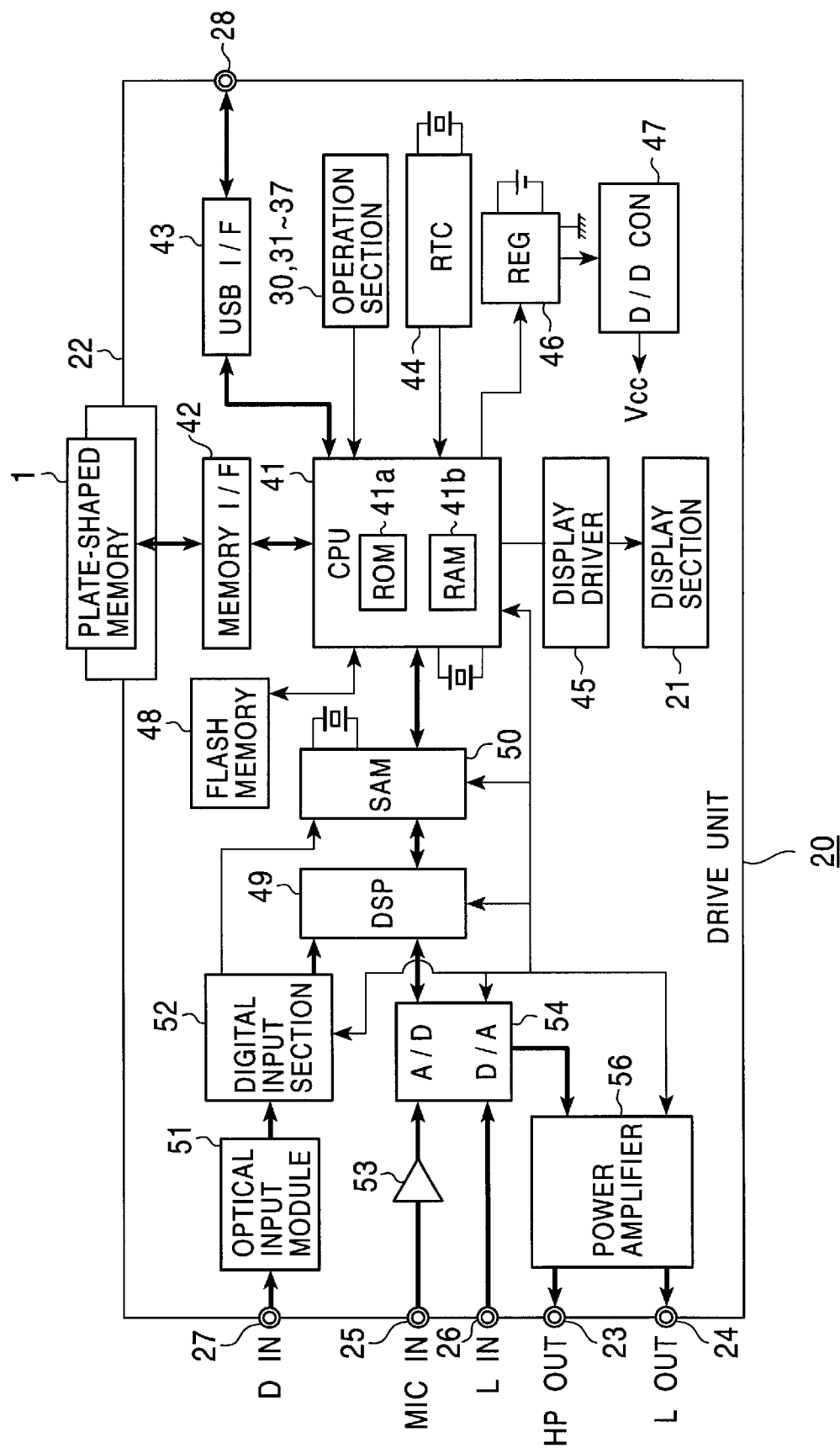
FIG. 4 is a block diagram of a drive unit according to the embodiment of the present invention.

FIG. 4 shows the internal construction of the drive unit 20.

Various types of main data can be handled by this drive unit 20 as objects of writing and reading to and from the plate-shaped memory 1. For example, they include moving-image data, still-image data, voice data, high-sound-quality audio data (music data) of CDs and MDs, control data, etc.

A CPU 41 is a central control section for the drive unit 20 and performs operation control for each section (to be described below). Inside the CPU 41, for example, a ROM 41a having stored therein operation programs and various constants and a RAM 41b serving as a work area are provided. Also, an operation section 30 corresponds to the abovedescribed various operation elements (31 to 37), and the CPU 41 executes a control operation defined by an operation program according to the operation input information from the operation section 30. Furthermore, a flash memory 48 is provided, and the CPU 41 can cause system setting information relating to various operations, such as a music recording mode, a playback volume, and a display mode, to be stored in the flash memory 48.

The resume playback operation of this example is an operation in which a playback is started from a position relating to a previous playback or recording operation. For this reason, it is necessary to store the track number and the address as position determination information relating to the previous playback or recording operation. This position determination information (hereinafter also referred to as "resume data") is stored in the flash memory 48.

A real-time clock 44 is what is commonly called a "clock section" and keeps track of the date and time. The CPU 41 can confirm the current date and time from the date and time data from the real-time clock 44.

A USB interface 43 is a communication interface to and from an external apparatus connected to the USB connector 28. The CPU 41 can perform communication with, for example, an external personal computer of FIG. 1, via the USB interface 43. For example, control data, computer data, image data, audio data, etc., are transmitted and received.

The power-supply section includes a regulator 46 and a DC/DC converter 47. When the power supply is to be switched on, the CPU 41 instructs the regulator 46 to switch on the power supply. The regulator 46 starts supplying power from a battery in accordance with the instruction. The power voltage from the battery is converted by the DC/DC converter 47 into a predetermined voltage value and is supplied, as an operating power-supply voltage Vcc, to each block. For example, an AC adapter terminal may be formed so that supply of power from an external commercial power source becomes possible.

As a result of the plate-shaped memory 1 being loaded into the detachable mechanism 22, it is possible for the CPU 41 to access the plate-shaped memory 1 via a memory interface 42, so that recording, playback, editing, etc., of various types of data can be performed.

Also, by controlling a display driver 45, the CPU 41 can make the display section 21 display a predetermined image. For example, a menu and a guidance display for operations by the user, or a display of the file contents, etc., stored in the plate-shaped memory 1 is produced. Also, for example, if image data of moving images or still images has been recorded in the plate-shaped memory 1, it is possible to read out this image data so that this is displayed on a display section 21.

In the manner as described above, in this example, for the purpose of input and output of an audio signal (music signal, voice signal), the digital input terminal 27, the microphone input terminal 25, the line input terminal 26, the headphone terminal 23, and the line output terminal 24 are formed.

As an audio signal processing system for these terminals, a SAM (Security Application Module: encryption/decryption processing section) 50, a DSP (Digital Signal Processor) 49, an analog-to-digital/digital-to-analog conversion section 54 (hereinafter referred to as an "AD/DA conversion section), a power amplifier 56, a microphone amplifier 53, an optical input module 51, and a digital input section 52 are provided.

The SAM 50 performs encryption and decryption of data between the CPU 41 and the DSP 49, and exchanges an encryption key with the CPU 41. In accordance with a command from the CPU 41, the DSP 49 performs an audio data compression/decompression process and various acoustic effects processing, such as reverberation, tone control, equalizing, and surround processing. The digital input section 52 performs an input interface process of digital audio data obtained by an optical input module. The AD/DA conversion section 54 performs AD conversion and DA conversion of an audio signal.

These blocks allow an audio signal to be input and output in the following manner. A signal, as digital audio data, supplied from an external apparatus through an optical cable to the digital input terminal 27 is photoelectrically converted by the optical input module 51 and is input thereto, and in the digital input section 52, a receiving process in conformance with the transmission format is performed. Then, the received and extracted digital audio data is compressed by the DSP 49 and is formed into recorded data, for example, in the plate-shaped memory 1.

In a case where a microphone is connected to the microphone input terminal 25, an input audio signal therefrom is amplified by the microphone amplifier 53, after which it is A/D-converted by the AD/DA conversion section 54, and is supplied, as digital audio data, to the DSP 49. Then, after undergoing a compression process in the DSP 49, the data is supplied to the CPU 41 and is formed into recorded data, for example, in the plate-shaped memory 1. Also, the input audio signal from the external apparatus connected to the line input terminal 26 is A/D-converted by the AD/DA conversion section 54, and is supplied, as digital audio data, to the DSP 49. Then, after undergoing a compression process in the DSP 49, the data is supplied to the CPU 41 and is formed into recorded data, for example, in the plate-shaped memory 1.

On the other hand, when the audio data read from, for example, the plate-shaped memory 1 is to be output, the CPU 41 makes the DSP 49 perform a decompression process and various acoustic effects processes on the audio data. The digital audio data undergoing these processes is converted by the AD/DA conversion section 54 into an analog audio signal and is supplied to the power amplifier 56. In the power amplifier 56, an amplification process for a headphone and an amplification process for line output are performed on the signal, and the resulting signal is supplied to the headphone terminal 23 and the line output terminal 24, respectively.

Also, in the drive unit 20, an encryption process is performed by the SAM 50 on audio data (compressed data) read from the plate-shaped memory 1, and audio data which is input from the digital input terminal 27, the headphone terminal 23, or the line input terminal 26 and which is subjected to a compression process, and the data can be supplied from the USB connector 28 through the USB interface 43 to an external apparatus, such as the personal computer 11.

In addition, a decoding process, which is what is commonly called "decryption", is performed by the SAM 50 on the encrypted audio data which is input from the external apparatus connected to the USB connector 28, and then the audio data can be recorded in the plate-shaped memory 1, or an decompression process is performed by the DSP 49 thereon and the audio data can be output from the headphone terminal 23 and the line output terminal 24.

The construction of the drive unit 20 shown in FIG. 4 is merely an example, and is not limited to this example. That is, the present invention may be any type of recording and playback apparatus as long as a construction is adopted in which data can be written and read into and from the plate-shaped memory 1. The present invention may be realized as a playback apparatus having only a playback function.

4. File Structure in the Plate-shaped Memory

The structure of files stored in the plate-shaped memory 1 will now be described. An example of the directory structure is shown first in FIG. 5. As described above, examples of main data which can be handled by the plate-shaped memory 1 include moving-image data, still-image data, voice data, high-sound-quality audio data, such as music data, control data, etc. For this reason, in the directory structure, from the root directory, a VOICE (directory of voice), a DCIM (directory of still images), an MOxxxxnn (directory of moving images), an AVCTL (control directory), and an HIFI (directory of pieces of music) are placed.

Figure 5:
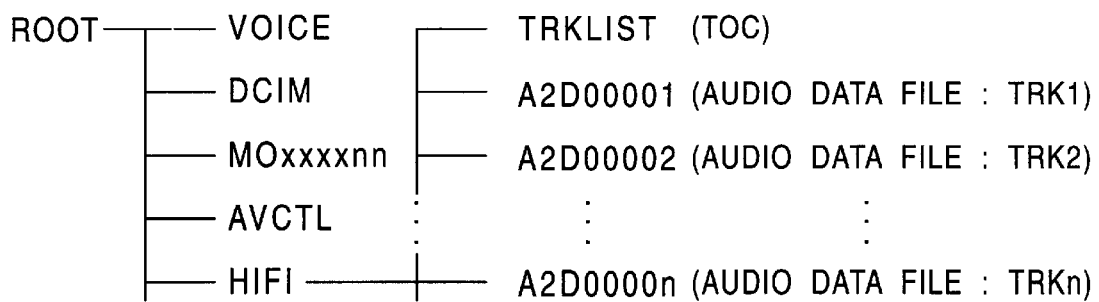
FIG. 5 is an illustration of a directory structure in a plate-shaped memory according to the embodiment of the present invention.

In this example, since a file for music data is taken as an example and a list of pieces of music to be played (to be described later) is described, the subdirectory of the directory HIFI is shown. As the subdirectory of the directory HIFI, as shown in FIG. 5, a track list TRKLIST, audio data files (A2D00001, A2D0002, ... A2D000n), etc., are formed. The subdirectory names (folder names, file names), A2D00001, etc., and the type of file are tentatively set for the sake of illustration.

The "track list TRKLIST" is management information for audio data files, etc., and is information corresponding to what is commonly called a TOC (Table of Contents) in a CD and an MD. Hereinafter, this track list is referred to as a "TOC". More specifically, parts, names, the address pointers, etc., of the tracks as an audio data file recorded in the plate-shaped memory 1 are described. Therefore, by referring to this TOC, it is possible for the drive unit 20 to know the number of tracks as a recorded audio data file, the name of each piece of music, the access position during a playback, etc. The audio data files are managed in a state in which a program number which is a track number in the TOC is assigned, and this track number corresponds to the sequence of the pieces of music to be played back during a normal playback.

Tracks as an audio data file are a file as one program, and each of these tracks is managed in the sequence of track numbers (TRK1, TRK2, . . . ) in the TOC. In the system of this example, audio data recorded as tracks is data on which compression of an ATRAC2 (Adaptive Transform Acoustic Coding) (trademark) method is performed by the DSP 49.

By forming the directory structure in which the above TOC and tracks are recorded, in this system, it is possible to record and play back tracks. The directory structure such as that shown in FIG. 5 is merely an example, and for example, there is a case in which a folder is further formed at a level below a subdirectory, and there is also a case in which an additional information file, such as, for example, a file for recording information associated with tracks, is formed.

Figure 6:
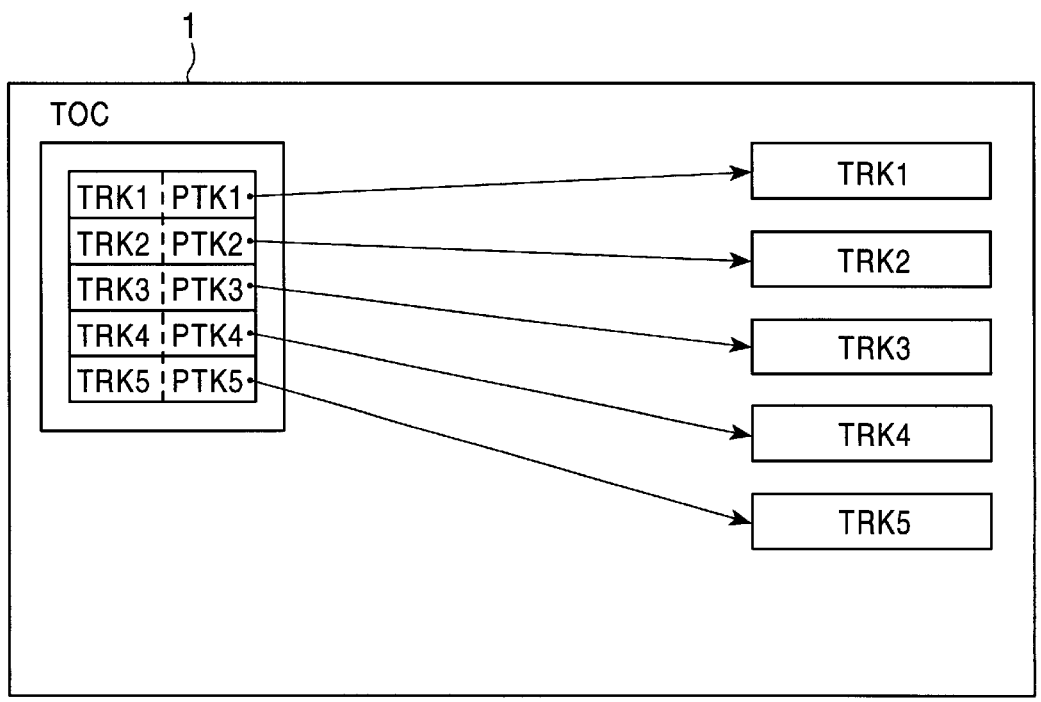
FIG. 6 is an illustration of a file structure in a plate-shaped memory according to the embodiment of the present invention.

FIG. 6 shows an example of files recorded in the plate-shaped memory 1.

In the example of FIG. 6, in the plate-shaped memory 1, at the root of the directory structure, five tracks, that is, five pieces of music, are recorded as tracks TRK1 to TRK5, respectively. It is schematically shown that these tracks TRK1 to TRK5 are indicated by pointers PTK1 to PTK5 of the TOC, respectively. That is, the tracks TRK1 to TRK5 are recorded in a state managed by the TOC. It is possible for the TOC to manage not only the pointers as described above, but also names of pieces of music and other information with respect to each track.

For example, in a recording state such as that shown in FIG. 6, during a playback, the drive unit 20 plays back each track in the sequence of pieces of music managed by the TOC, that is, in the sequence of the track numbers. Therefore, in the case of a playback in which the user does not particularly specify a track number, the track TRK1 is played back first, and after the playback thereof, the track TRK2 is then played back. Thus, a playback is performed in that sequence, and when the playback of the track TRK5 is terminated, the series of playback operations are terminated.

5. Playback Operation in Various Resume Mode States

Examples of a resume playback operation of this example will now be described schematically with reference to FIGS. 7A, 7B, 7C, and 7D, and FIGS. 8A, 8B, and 8C.

In order to resume a playback, some conventional CD players, MD recorders, etc., are provided with a function for starting a playback from the position at which the previous playback operation was stopped. In this example, in addition to such a resume playback, a variety of types of resume playback are realized. That is, a plurality of modes are provided as states in which a resume mode is enabled (on), and even when the previous operation was a recording operation, the resume function can be utilized.

In the case of this example of description, as a resume mode, three states, a resume-off state, a first resume enabled state, and a second resume enabled state, can be selected.

Hereinafter, the first resume enabled state is called "resume-on", and the second resume enabled state is called "resume-track-on". The "resume-off" is a mode which is set by a user when a resume function is not used, that is, the resume function is disabled. The "resume-on" and the "resume-track-on" are set by a user so as to accord with its playback purpose when use of a resume function is desired.

Figure 7A:
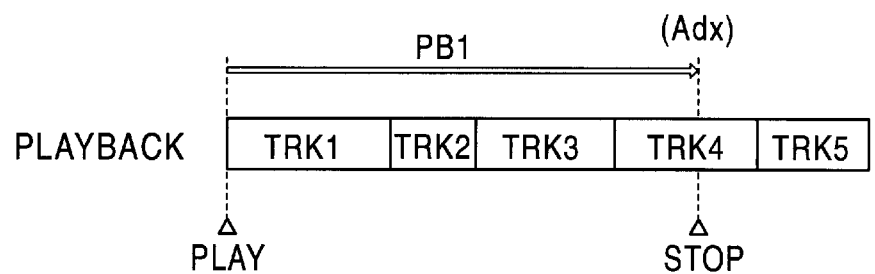
FIG. 7A is an illustration of a position at which a first playback is stopped according to the embodiment of the present invention.

FIGS. 7A, 7B, 7C, and 7D show an example of a playback start position for each resume mode in a case where a playback operation is performed again after a particular playback operation is stopped. FIG. 7A shows a previous playback operation. In FIGS. 7A, 7B, 7C, and 7D, and in FIGS. 8A, 8B, and 8C, each track is arranged in the sequence of track numbers which is a normal playback sequence. It is a matter of course that this does not correspond to the physical data recording position in the plate-shaped memory 1.

As shown in FIGS. 7A, 7B, 7C, and 7D, as a result of a user performing a playback operation, a playback PB1 is performed starting from the track TRK1 on the basis of the TOC in the manner as described above. It is assumed that, for example, the user performs a stopping operation in the middle of the track TRK4. In a case where a resume function is used, at this time, the CPU 41 causes the address Adx which is a stopped position and/or the track TRK4 at which the playback is stopped to be stored in the flash memory 48. However, in a case where resume-off is set at this time of stopping, storing these is unnecessary, but they may be stored. The detailed processing of the CPU 41 at the time of playback and recording, including a resumption of operation, will be described later.

Figure 7B:
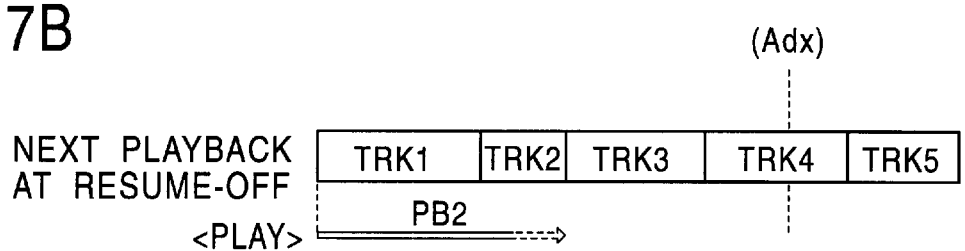
FIG. 7B is an illustration of a playback operation at a resume-off according to the embodiment of the present invention.

In a case where the next playback is performed at the resume-off, the state becomes as shown in FIG. 7B. That is, in response to the playback operation performed by the user, a playback PB2 is performed from the normal playback start position, that is, the beginning of the track TRK1.

Figure 7C:
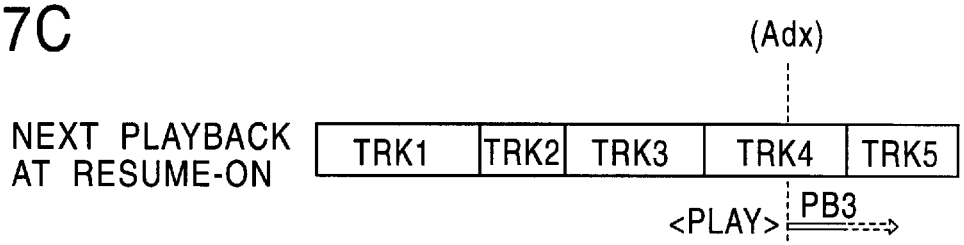
FIG. 7C is an illustration of a resume playback operation in a resume-on mode after the playback is stopped according to the embodiment of the present invention.

However, in a case where resume-on has been set at the time of playback in FIG. 7A, when a playback operation is performed next, the state becomes as shown in FIG. 7C. That is, the playback start position becomes the previously stopped position. In other words, the address Adx stored in the flash memory 48 is assumed to be a playback start position, and a playback PB3 which performs a playback from the address Adx in the middle of the track TRK4 is performed in response to a playback operation as shown in FIG. 7C.

Figure 7D:
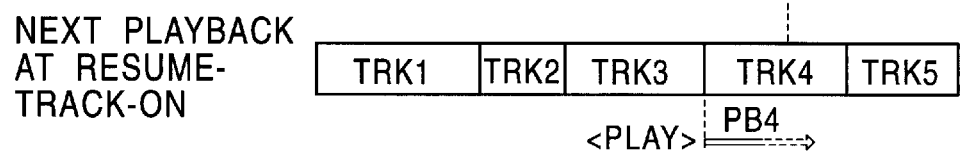
FIG. 7D is an illustration of a resume playback operation in a resume-track-on mode after the playback is stopped according to the embodiment of the present invention.

In a case where resume-track-on has been set at the time of a playback in FIG. 7A, when the next playback is performed, the state becomes as shown in FIG. 7D. That is, the playback start position is from the start of the track including the previously stopped position. In other words, assuming that the beginning of the track of the track number stored in the flash memory 48 is a playback start position, a playback PB4 which performs a playback from the track TRK4 is performed in response to the playback operation as shown in FIG. 7D. That is, it is possible for the user to select, as a playback start position during a resume playback, the previously stopped position or the beginning of the track including the previously stopped position. Also, in the manner as described above, in this example, a resume function can also be used at the time of a playback after a recording operation.

Figure 8A:
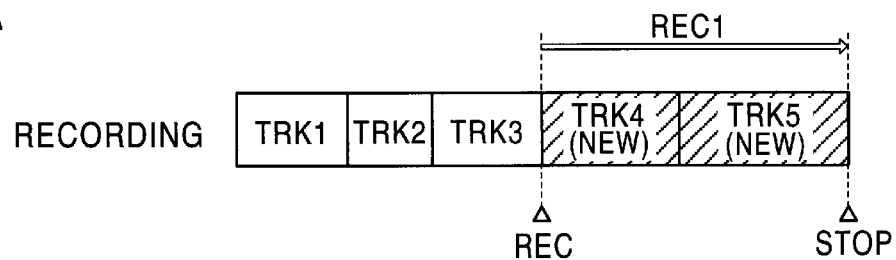
FIG. 8A is an illustration of a recording operation according to the embodiment of the present invention.

FIG. 8A shows a particular recording operation. This shows a state in which, for example, tracks TRK1 to TRK3 are recorded in the plate-shaped memory 1, a recording operation is performed, and as a recording operation REC1, two tracks TRK4 and TRK5 are newly recorded.

Figure 8B:
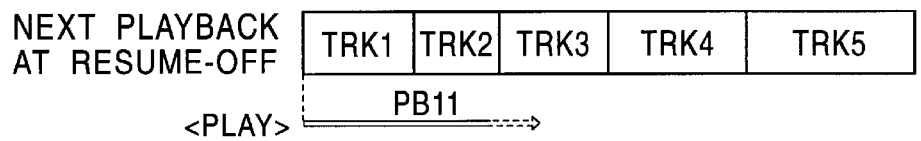
FIG. 8B is an illustration of a resume playback operation at resume-off after a recording is stopped according to the embodiment of the present invention.

In a case where the next playback is performed at the resume-off after such a recording operation, the state becomes that shown in FIG. 8B. That is, in response to the user performing a playback operation, a playback PB11 which performs a playback from the normal playback start position, i.e., from the beginning of the track TRK1, is performed. However, in a case where the resume-on or the resume-track-on has been set at the time of a recording in FIG. 8A, when the next playback operation is performed, the state becomes that shown in FIG. 8C. That is, the playback start position becomes the start position of the previous recording operation, and a playback PB12 which performs a playback from the track TRK4 of the previous recording operation is performed. As described above, the resume function can be used even at the time of a playback after recording.

Figure 8C:
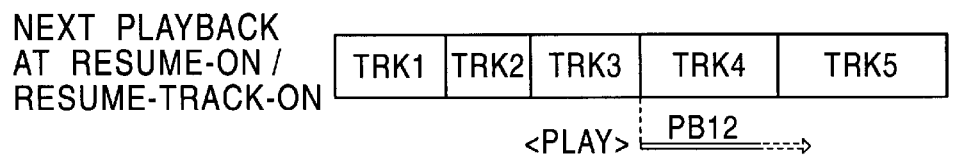
FIG. 8C is an illustration of a resume playback operation at resume-on after a recording is stopped according to the embodiment of the present invention.

Although in the example in FIGS. 8A and 8C, the start position of a resume playback is the same for both cases of resume-on and resume-track-on, of course, the playback start position may be varied depending on whether the mode is resume-on or resume-track-on. Such an example will be described later as a modification.

6. Resume Setting Process

Figure 9:
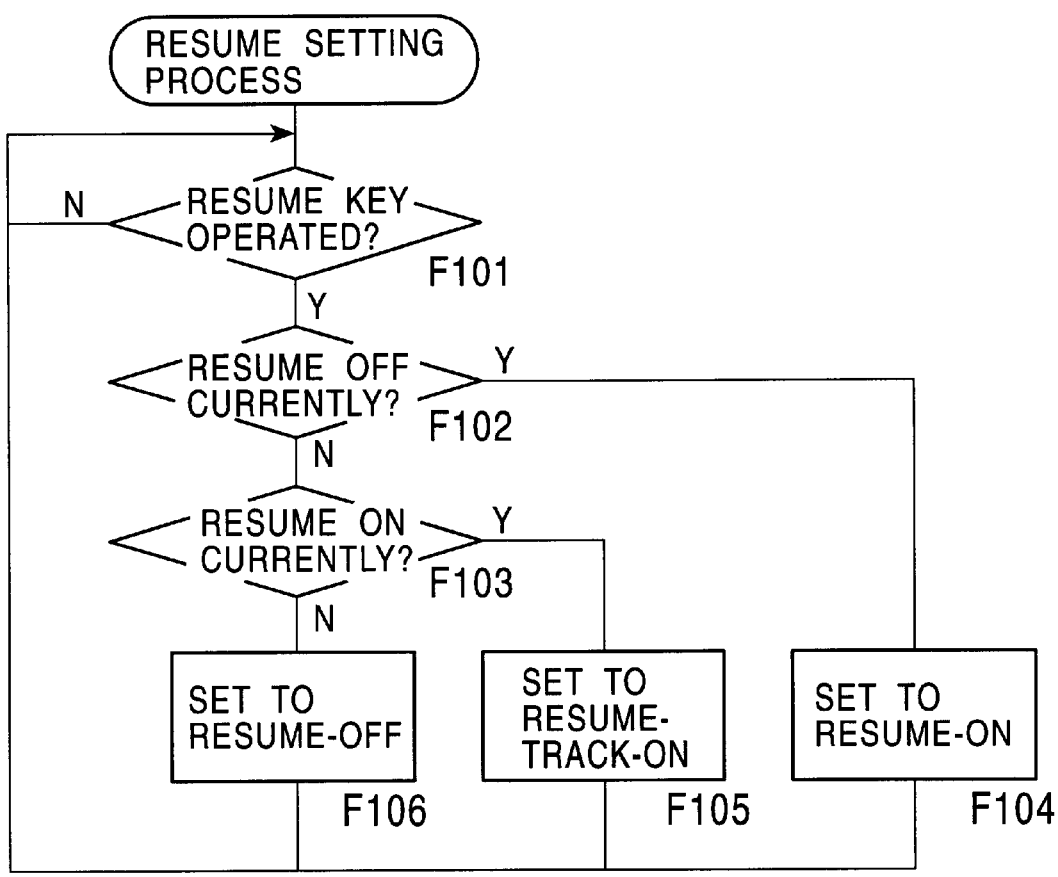
FIG. 9 is a flowchart of a resume setting process according to the embodiment of the present invention.

In a case where a resume function such as that described above is used, it is necessary for the user to select a resume mode in advance. The selection can be made by the resume key 37. When the resume key 37 is operated, the CPU 41 sets the resume mode according to the processing of FIG. 9.

When it is detected that the user has operated the resume key 37, the CPU 41 makes the process proceed from step F101 to steps F102 and F103, and makes the process to branch according to the current resume mode. There are three resume modes: resume-off, resume-on, and resume-track-on in the manner as described above. When the mode is currently resume-off, the process proceeds to step F104, whereby the mode is set to resume-on. On the other hand, if the mode is currently resume-on, the process proceeds to step F105, whereby the mode is set to resume-track-on. Furthermore, when the mode is currently resume-track-on, the process proceeds to step F106, whereby the mode is set to resume-off.

Since the resume mode is changed and set in this manner in response to the operation of the resume key 37, the user is able to select a desired resume mode by pressing the resume key 37 several times. That is, in response to the operation of the resume key 37, the mode setting is switched as follows: resume-off→resume-on→resume-track-on→resume-off→ . . .

7. Playback Process

Figure 10:
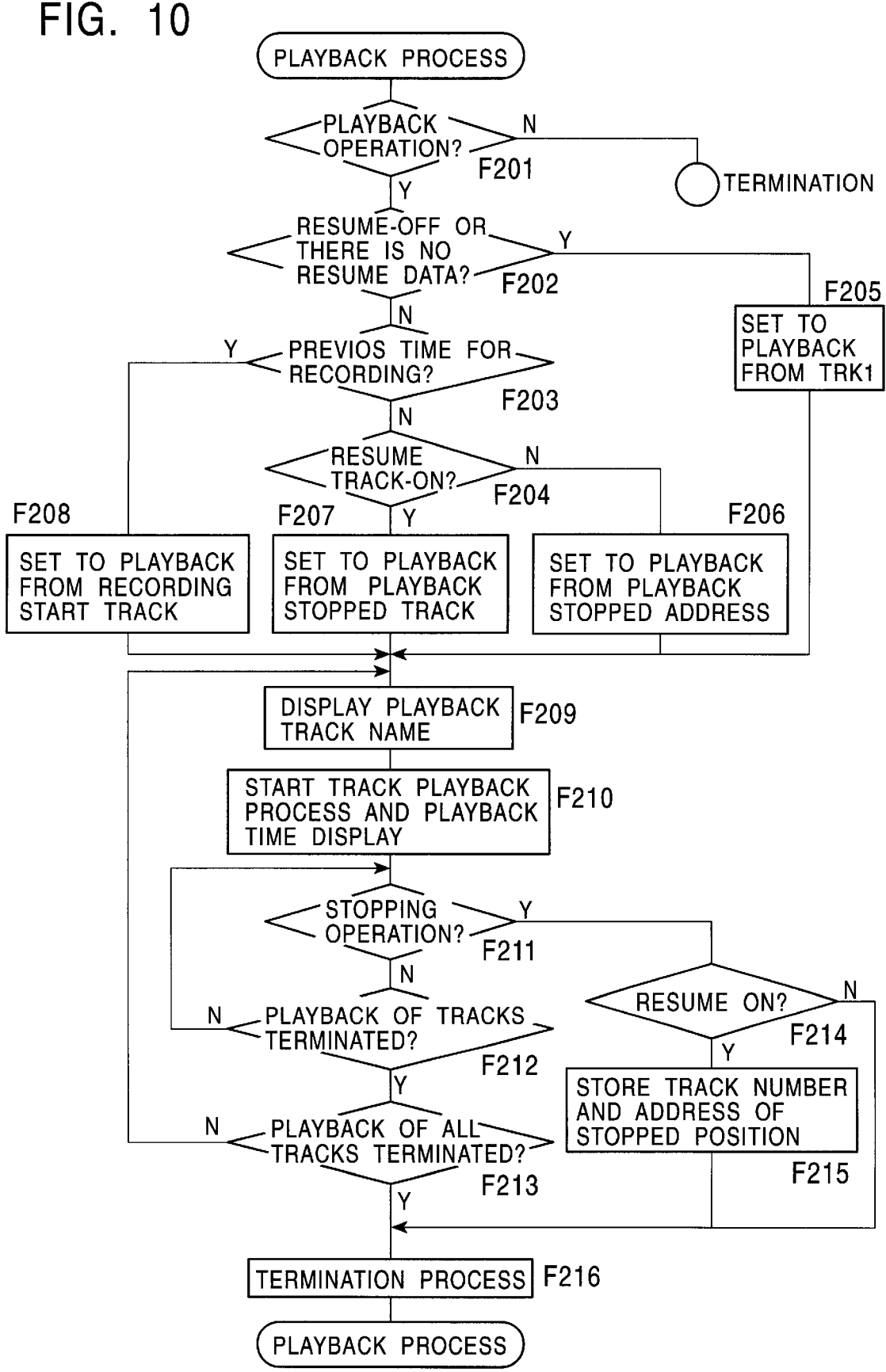
FIG. 10 is a flowchart of a playback process according to the embodiment of the present invention.

Referring to FIG. 10, a description is given below of a process of the CPU 41 in a case where the drive unit 20 plays back a program, i.e., tracks, recorded in the plate-shaped memory 1. This process allows a playback operation corresponding to the resume mode to be performed, as shown in FIGS. 7A, 7B, 7C, and 7D.

As a result of the user pressing the playback key, the CPU 41 starts a playback operation process. The CPU 41 makes the process proceed from step F201 in FIG. 10 to step F202 in response to the operation of the playback key 31, whereby initially, it is confirmed whether or not the mode is currently resume-off or whether or not there is resume data. In the case of resume-off, the process proceeds to step F205, whereby the normal playback start position, i.e., the beginning of the track TRK1 managed by the TOC, is assumed to be a playback start position. Also, even if the mode is currently resume-on or resume-track-on, in a case where a recording or playback has not been performed in a resume-on state or in a resume-track-on state immediately before the playback for this time or in a case where the previous playback operation has been terminated in a state in which the playback of all the tracks has been completed, namely, in a case where the track number or the address relating to the previous process or recording has not been stored as resume data, the playback start position at the time of a playback for this time becomes from the beginning of the start track in a manner similar to the case of resume-off.

Then, in step F209, the track name of the first track TRK1 to be played back, for example, character information recorded as the TOC or as additional information, is displayed on the display section 21. If character information is not present, the track number is displayed. Then, in step F210, the playback of the track TRK1 is started in step F210. That is, the CPU 41 reads the data of the track TRK1 from the plate-shaped memory 1 and outputs the playback audio data thereof. As a result, a playback such as that shown in FIG. 7B is performed. The output of the playback audio data is performed from the headphone terminal 23, the line output terminal 24, the USB connector 28, etc., after undergoing a process for each block in the manner as described above. Also, at the time of a playback of tracks, the CPU 41 causes the track number, time information such as the playing progress time of a piece of music, additional information, etc., to be displayed on the display section 21.

While the tracks are being played back, the CPU 41 monitors a stopping operation by the user and the termination of the playback of the tracks in steps F211 and F212, respectively. When the playback of the track which is currently being played back is terminated, the process proceeds from step F212 to step F213 where it is determined whether or not the current track is the last track. If the current track is not the last track, the process returns to a process from step F209, whereby the display and playback of the next track, which is the track TRK2 in this case, are performed.

As described above, by performing the processing from steps F209 to F213, the tracks managed by the TOC are played back in the sequence of track numbers. When the playback of the last track is completed, at that point in time, the process proceeds from step F213 to step F216, whereby a playback termination process, for example, reading from the plate-shaped memory 1, a decompression process and an acoustic process in the DSP 49, a D/A conversion process in the AD-DA conversion section, etc., is terminated, and the display operation in the display section 21 associated with playback is terminated, thereby terminating the series of playback operation processing.

Also, when the user operates the stop key 32 in the middle of the playback, at that point in time, the process proceeds from step F211 to step F124. If the mode is resume-off at this point in time, a termination process is performed in step F216, and the playback operation processing is terminated.

However, in a case where the user has operated the resume key 37 during a playback so as to set the resume mode to resume-on or resume-track-on, when the process proceeds to step F214 because a stopping operation occurs, the process proceeds to step F215. Here, the CPU 41 causes the address of that position at which the playback was stopped and the track number of the track which was being played back to be stored, as resume data to be used for the next playback operation, in the flash memory 48. Then, after undergoing the process of step F216, the playback operation is terminated.

In a case where the mode is resume-on or resume-track-on, when a playback stopping operation is performed, since the address and the track number at that point in time are stored, it is possible to perform a playback from the position based on the stored address or the stored track number at the next playback time.

In a case where the mode is resume-on or resume-track-on when a playback stopping operation is performed by the user and the resume data was stored at the time of the previous playback or recording, the process proceeds from step F202 to step F203, whereby it is determined whether or not the previous operation was a recording operation. Whether or not the previous operation was a recording operation can be determined by the contents of the resume data. For example, in the case of a recording operation, since the recording start address and the track number are stored as resume data in step F309 (to be described later) in the process of FIG. 11, if a flag indicating that the data is the recording start address is added to the content of the resume data, it can be determined that the previous operation was a recording operation.

In a case where the previous operation was a recording operation, the process proceeds to step F208, whereby the recording start address stored in the flash memory 48 is set to a playback start position, and the process proceeds to a playback process of step F209 and subsequent steps. That is, a playback, such as that shown in FIG. 8C, is performed.

In the case of this example, as shown in FIGS. 8A and 8C, with regard to a playback after recording, no discrimination is made between resume-on and resume-track-on, and a playback is performed from the beginning of the recording start track in both cases, and thus such a process as that described above is performed. However, as described in a modification (to be described later), also in a playback after recording, in a case where a playback start position is made to be different between resume-on and resume-track-on, a process is performed in which the setting of the playback start position differs depending on the mode.

In a case where the previous operation was a playback operation, the process proceeds from step F203 to step F204, whereby the process is made to branch depending on whether the mode is currently resume-on or resume-track-on. When the mode is resume-on, the process proceeds to step F206, whereby the address of the stored playback stopped position is set to a playback start position, and the process proceeds to a playback process of step F209 and subsequent steps. That is, a playback such as that shown in FIG. 7C is performed. When, in contrast, the mode is resume-track-on, the process proceeds to step F207, whereby the beginning of the track of the stored track number is set to a playback start position, and the process proceeds to a playback process of step F209 and subsequent steps. In this case, playback such as that shown in FIG. 7D is performed.

A process such as that shown in FIG. 10 allows a playback operation of each case shown in FIGS. 7A, 7B, 7C, and 7D and in FIGS. 8A, 8B, and 8C, i.e., setting of the playback start position, to be performed. Also, in a case where a playback is started in a state of resume-on or resume-track-on in manners such as those described above, when the user performs a stopping operation before the playback up to the last track is completed, as long as the mode is not changed to resume-off at that point in time, in step F215, the address and the track number are stored, as resume data for a resume playback operation for the next time, in the flash memory 48.

Such a resume playback process makes it possible for the user to play back the recorded portion from the start thereof by performing a resume playback immediately after a piece of music, etc., is recorded. Immediately after the recording, in particular, a playback for confirming the recorded contents is often performed. Therefore, the performing of a playback from the recording start position by such a resume playback immediately after recording is very useful. Also, after the playback is stopped, it is possible to perform a playback by selectively setting whether the playback should be performed from that playback stopped position or the beginning of the track including that playback stopped position. In a case where a particular piece of music is stopped in the middle thereof, for some users, there is a desire to play back the piece of music from the start thereof once more the next time. Therefore, the capability of selecting whether a resume playback should be performed from the playback stopped position or from the beginning of the track including that playback stopped position is very useful. Of course, since the resume playback from each of these positions only requires selection of the resume mode in advance, the operation is very simple, and it is possible to perform a playback from a position at which listening is desired without requiring a search operation or an operation for locating the start.

8. Recording Process

In order to make the beginning of the recording start track a playback start position at the time of a playback after recording as in step F208 of FIG. 10, that position must have been stored as resume data at the time of a recording. A process at the time of a recording, including such a process, is described below with reference to FIG. 11.

When a recording operation is performed by the user by operating the sound-recording key 35, the process of the CPU 41 proceeds from step F301 to step F302, whereby initially, the recording is set in a standby state, and the standby state and the track number indicating a track to be recorded are displayed on the display section 21. For example, in a case where a recording operation is performed from the state in which three tracks have already been recorded as shown in FIG. 8A, the recording is placed in a standby state in a state in which the track TRK4 is displayed.

In that state, for example, when the user performs a recording start operation by operating the playback key 31, the process proceeds to step F304, whereby a recording process is started. That is, the AD/DA conversion section 54, the DSP 49, etc., perform a required process on audio signals which are input from the line input terminal 26, the microphone input terminal 25, the digital input terminal 27, or the USB connector 28, and audio data thereof is recorded, as tracks, in the plate-shaped memory 1. Also, the display section 21 is made to produce a display of the track number and the recording progress time.

While a recording process is being performed on the plate-shaped memory 1, the CPU 41 monitors a stopping operation by the user, a recordable storage capacity or the remaining storage capacity of the plate-shaped memory 1, the termination of the input of recording data, and the change of tracks in steps F305, F306, F307, and F308, respectively.

In a case where recording data is supplied, as digital data, from, for example, a CD player, a personal computer, etc., since data, such as track number data, by which the delimitation of tracks can be identified, has been added to the input data, the CPU 41 can know the track change timing by monitoring the delimitation. Also, in a case where an analog audio signal is supplied from the microphone input terminal 25 or the line input terminal 26, if, for example, a voiceless period of more than a predetermined length is detected, it is possible to make the voiceless period represent a track change timing. When the track change is detected in this manner, the CPU 41 makes the process return from step F308 to step F304 so as to go to a process for recording the next track. For example, in the case of FIG. 8A, the process goes from the recording of the track TRK4 to the recording of the track TRK5.

In a case where the user performs a recording stopping operation by operating the stop key 32, or in a case where the plate-shaped memory 1 is recorded fully up to its limit and data can no longer be recorded, or in a case where it is detected that supply of input data is terminated, the process proceeds from step F305, F306, or F307 to step F309, whereby initially, the resume mode at that point in time is confirmed. If the mode is resume-off, the process proceeds to step F311, whereby the termination of the recording operation is notified to each section, and the TOC recorded in the plate-shaped memory 1 is updated in accordance with the recording operation for this time, thereby terminating the processing. If, in contrast, the mode is resume-on or resume-track-on, in step F310, the address and the track number, at which the recording operation for this time is started, are stored, as resume data, in the flash memory 48, and thereafter, the process of step F311 is performed, thereby terminating the recording process.

If the mode is resume-on or resume-track-on in this manner, since the address and the track number of the recording start position are stored as resume data, in the playback process of FIG. 10 described above, the recording start position setting in step F308 becomes possible, that is, a resume playback such as that shown in FIG. 8C becomes possible.

9. Modifications

Although the embodiments have been described in the foregoing, the present invention is not limited to these constructions and operations, and various modifications can be conceived as examples of a playback start position in a resumption of operation, types and the number of resume modes, types and contents of resume data containing stored position determination information, and can be conceived as a playback process and a recording process.

Figure 11:
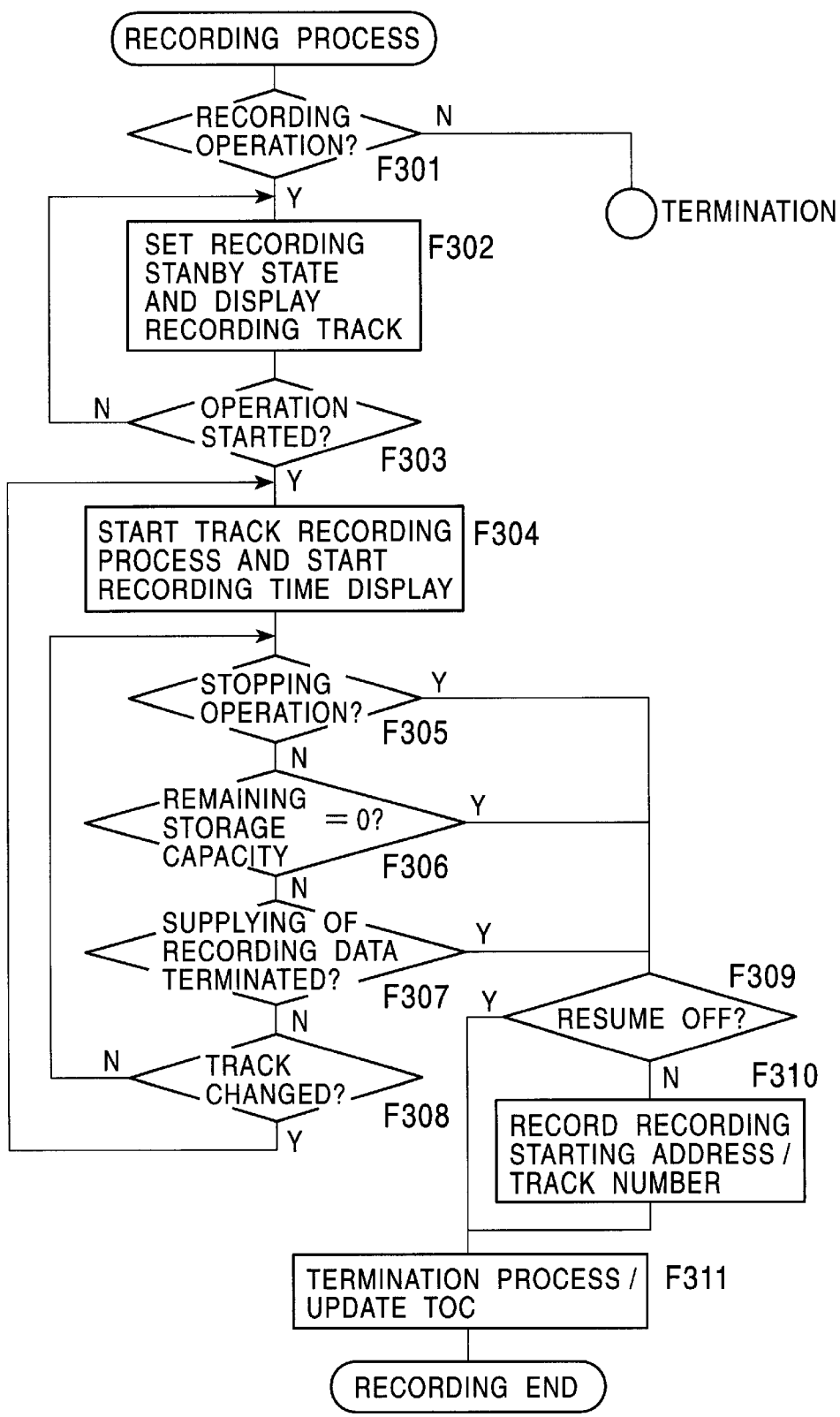
FIG. 11 is a flowchart of a recording process according to the embodiment of the present invention.

First, in the above-described example, in order to perform a resume playback, it is necessary to set resume-on or resume-track-on in advance when at least a playback or recording is stopped at the time of a previous playback or recording. The reason for this is that if the mode is not resume-on or resume-track-on, a process for storing resume data in step F215 of FIG. 10 or in step F310 of FIG. 11 is not performed. However, if the resume data is stored regardless of the resume mode when the playback or recording was stopped, that is, if the process of step F215 or the process of step F310 is always performed when a stopping operation is performed, it is possible for the user to realize a desired resume playback by setting the mode to resume-track-on or resume-on immediately before a playback operation in which a resume playback is to be performed. Such a resume operation method may be employed.

Also, although in step F215 or in step F310, both of the track number and the address are stored as resume data, for example, for the resume data, only the address of the playback stopped position may be stored, and in the case of recording, only the address of the playback start position may be stored. The reason for this is that if the address is known, it is possible to determine the track number from the TOC data. Alternatively, at the time of step F215 described above, if the mode is resume-on, the address may be stored, and if the mode is resume-track-on, the track number may be stored. Of course, in the case of step F310 described above, only the track number at which the recording was started may be stored.

In a case where both of the address and the track number are stored as in the above-described example or in a case where only the address is stored, even if the resume mode is switched between the resume-track-on and the resume-on immediately before the playback, handling the above case is possible. For example, in a case where a particular playback operation is performed in the state of the resume-track-on and a stopping operation is performed in the middle thereof, at least only the track number need be stored for the purpose of the next playback. If the address is also stored at that time, even when the resume mode is changed to resume-on immediately before the next playback, it is possible to perform a playback in response to a request for a playback from the stopped position by the change.

Furthermore, some playback apparatuses are capable of loading a plurality of recording media so as to make selective playback possible. An example thereof is a CD player with a CD changer. Even in the case of the plate-shaped memory 1, in the manner as described above, a playback apparatus capable of loading a plurality of plate-shaped memories 1 so as to play back each one can be realized. In such a case, numbers for each medium may be added as resume data. As a result, even if a plurality of media are loaded, at the time of a resume playback, a playback can be performed from the stopped position of the medium in which the playback was stopped previously or from the beginning of the track thereof containing the stopped position.

Although in the above-described example, in the resume playback after recording, a playback is performed from the beginning of the recording start track for both cases of resume-on and resume-track-on, an example can be conceived in which another playback position is set as shown in FIGS. 12A, 12B, 12C, and 12D and in FIGS. 13A, 13B, 13C, and 13D.

Figure 12A:
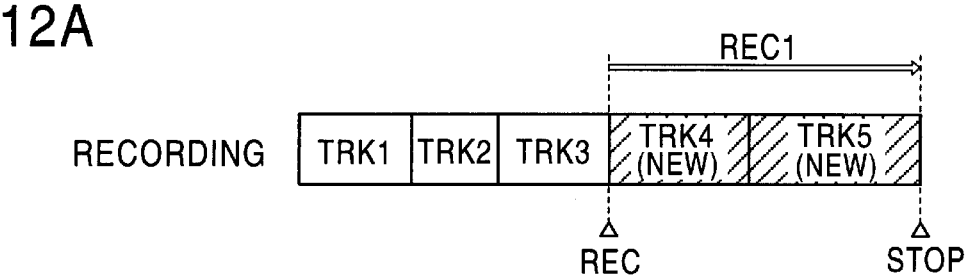
FIG. 12A is an illustration of a position at which a recording is stopped according to a modification of the embodiment of the present invention.
Figure 12B:
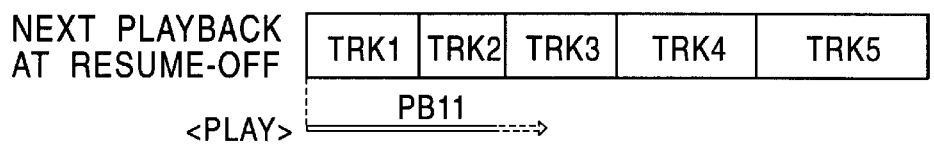
FIG. 12B is an illustration of a resume playback operation in a resume-off mode after a recording is stopped according to a modification of the embodiment of the present invention.
Figure 12C:
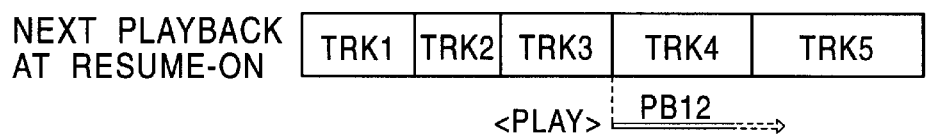
FIG. 12C is an illustration of a resume playback operation in a resume-on mode after a recording is stopped according to a modification of the embodiment of the present invention.
Figure 12D:
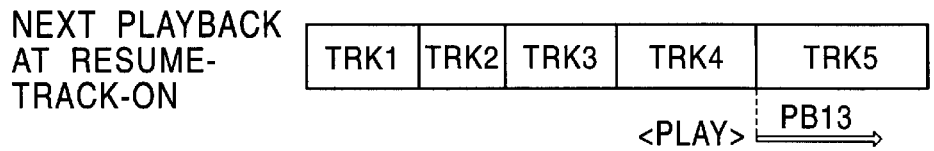
FIG. 12D is an illustration of a resume playback operation in a resume-track-on mode after a recording is stopped according to a modification of the embodiment of the present invention.

FIGS. 12A, 12B, 12C, and 12D show a playback operation immediately after recording in a manner similar to the case of the FIGS. 8A, 8B, and 8C. In the case of this example, after the tracks TRK4 and TRK5 are recorded as shown in FIG. 12A, when a playback is instructed at the resume-off, as shown in FIG. 12B, a playback PB11 is performed from the beginning of the track TRK1. Also, when a playback is instructed at the resume-on, a playback PB12 is performed from the beginning of the first track TRK4 which was recorded as shown in FIG. 12C. Furthermore, when a playback is instructed at the resume-track-on, a playback PB13 is performed from the beginning of the last track TRK5 which was recorded as shown in FIG. 12D. That is, for performing the resume playback after recording, it is possible for the user to select the position at which a playback is to be started by selecting the mode of resume-on or resume-track-on. The relationship between the resume mode and the playback start position may be the reverse. That is, a playback such as that in FIG. 12D at the resume-on or playback such as that in FIG. 12C at the resume-track-on may be performed.

Figure 13A:
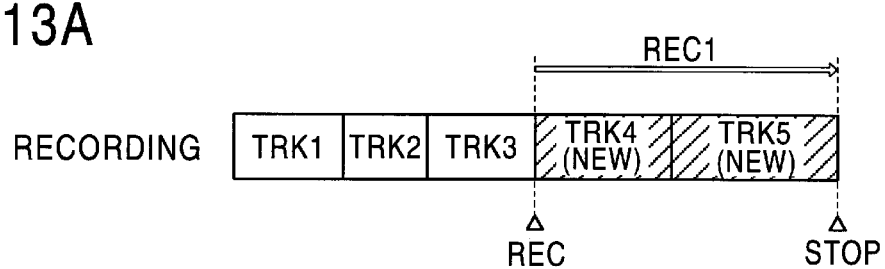
FIG. 13A is an illustration of a position at which a recording is stopped according to a modification of the embodiment of the present invention.
Figure 13B:
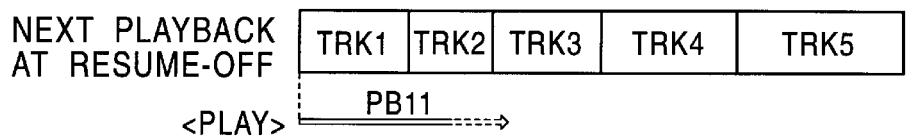
FIG. 13B is an illustration of a resume playback operation in a resume-off mode after a recording is stopped according to a modification of the embodiment of the present invention.
Figure 13C:
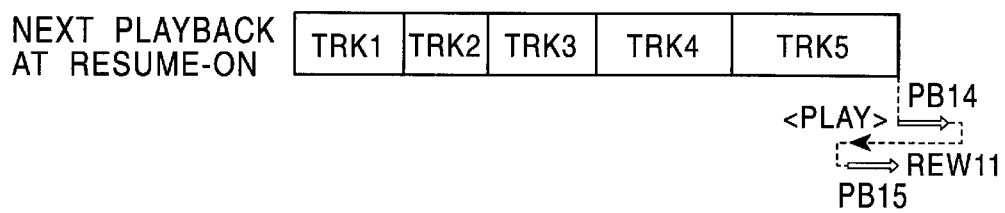
FIG. 13C is an illustration of a resume playback operation in a resume-on mode after a recording is stopped according to a modification of the embodiment of the present invention.

FIGS. 13A, 13B, 13C, and 13D also show a playback operation immediately after recording in a manner similar to the case of FIGS. 8A, 8B, and 8C. In the case of this example, after the tracks TRK4 and TRK5 are recorded as shown in FIG. 13A, when a playback is instructed at the resume-off, a playback PB11 is performed from the beginning of the track TRK1 as shown in FIG. 13B. Also, when a playback is instructed at the resume-on, a playback PB14 is performed from the end of the last track in which a recording was performed as shown in FIG. 13C, i.e., from the address of the recording stopped position.

Figure 13D:
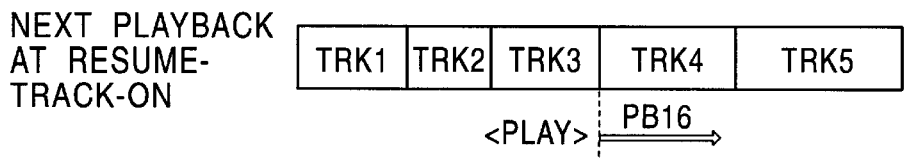
FIG. 13D is an illustration of a resume playback operation in a resume-track-on mode after a recording is stopped according to a modification of the embodiment of the present invention.

Furthermore, in a case where a playback is instructed at the resume-track-on, a playback PB16 is performed from the beginning of the first track TRK4 in which a recording was performed, as shown in FIG. 13D. Also in this case, for performing the resume playback after recording, it is possible for the user to select the position at which the playback is to be started by selecting the resume-on mode or the resume-track-on mode. Also, in the playback PB14 from the recording stopped position as shown in FIG. 13C, audio data is not played back in practice. However, by making rewinding REW11 corresponding to a rewinding operation and playback PB15 thereafter be performed at this point in time, it becomes possible for the user to confirm whether or not the recording has been performed correctly near the recording stopped position. That is, this is a resume mode suitable for confirming the end portion of the recording operation.

In order to confirm the end of the recording operation in this manner, if the playback start position as a resume playback is set to a position slightly before the recording stopped position, it is possible to confirm the recording end even if rewinding is not performed as described above, which is more preferable. In any case, by making a playback be performed from near the recording stopped position by a resume playback, this is convenient for confirming the end of the recording. Also in the case of FIGS. 13A, 13B, 13C, and 13D, the relationship between the resume mode and the playback start position may be the reverse, in a manner similar to the case of FIGS. 12A, 12B, 12C, and 12D.

The above-described embodiments and the modifications of FIGS. 12A, 12B, 12C, and 12D and FIGS. 13A, 13B, 13C, and 13D are each an example of a case in which there are three types of resume modes: resume-off, resume-on, and resume-track-on. Of course, there may be four or more types, that is, three or more types as modes for performing the resume function, excluding the resume-off.

Also, the recording media which can be used by the playback apparatus of the present invention are not limited to a plate-shaped memory, such as that shown in FIG. 1, and solid-state memory media of other exterior shapes, for example, memory chips, memory cards, memory modules, etc., may be used. Of course, the memory device is not limited to a flash memory, and other types of memory devices may be used. Furthermore, the memory device is not limited to a removable portable medium, and may be a recording medium which is contained in a playback apparatus in such a manner as not to be removable.

Also, resume data used at the resume time can be recorded on a recording medium which can be loaded into and removed from the drive unit 20 in a manner similar to the plate-shaped memory 1. By recording resume data in the plate-shaped memory 1, it is possible to perform a playback from the position at which the playback was stopped in the middle thereof even when, for example, the playback is performed by a drive unit other than the drive unit 20 which has performed the recording. Also, the present invention can also be applied to a system which uses a disk-shaped recording medium, such as a mini disk, a DVD (Digital Versatile Disc), a hard disk, a CD, a CD-ROM, a CD-R, etc, instead of a solid-state memory.

Although in the above-described examples, a resume playback of tracks as a music data file is described, this is merely an example. In addition to tracks (files) as music data, for example, the present invention can also be applied in exactly the same manner to a moving-image file, an audio data file, etc. In addition, the present invention can also be applied to audio-video playback software which runs in a computer, such as, for example, software which performs streaming playback using the Internet.

As can be understood from the above description, in the present invention, as a mode relating to a playback start position, one state can be set from three or more modes: resume-off as a resume disabled state in which a playback start position is a normal playback start position, and a plurality of resume enabled states, for example, resume-on and resume-track-on, in which a playback start position is a predetermined position corresponding to a previous playback or recording operation, respectively. Thus, when a playback is started in a particular resume enabled state, a playback from the playback start position corresponding to the resume enabled state can be performed. That is, it is possible for the user to select, as a playback start position corresponding to a playback operation, a plurality of positions as a playback start position as a position relating to the previous playback or recording operation in addition to the start position of the start track which is a normal playback start position, making it possible to widely select a desired playback start position according to the state of the user when the playback apparatus is used. This makes it possible to greatly improve usability and ease of use of the playback apparatus.

Also, since, as a playback start position which can be set in such a resume function, the position at which a playback operation was stopped during a previous playback and the beginning position of the first data file from among one or plural data files recorded in a previous recording operation, a playback apparatus for a data file having contents which are continuous in a time-related manner becomes most preferable for the user.

In addition, since, as a playback start position which can be set in a resume function, a selection can be made from the beginning position of the first data file from among one or plural data files recorded in a previous recording operation, the beginning position of the last data file from among one or plural data files recorded in a previous recording operation, and the end position or near the end position as the nearly end position of the last data file among one or plural data files recorded in a previous recording operation, this is preferable for the user to perform a confirmation operation after a recording is performed.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A reproduction apparatus for performing a resume reproduction which resumes a reproduction from a predetermined position of a predetermined data file of a storage medium in which one or plural data files are managed in accordance with management information, said reproduction apparatus comprising:

playback means for playing back a data file stored in said storage medium;

operation means by which a user selects and sets a predetermined resume mode from a plurality of resume modes, each of which instructs a reproduction start from a different reproduction start position in accordance with a reproduction starting instruction after a reproduction is stopped;

storage means for storing reproduction start position information on a recording medium, which information corresponding to a predetermined resume mode which is set by said operation means; and control means for controlling said playback means so that a reproduction is started from a predetermined position of a predetermined data file on the basis of the resume mode which is selected and set by said operation means from among a plurality of resume modes, resume start position information stored in said storage means, and said management information.

2. A reproduction apparatus according to claim 1, wherein in a case where said resume start position information is stored in said storage means, a resume reproduction is started on the basis of the resume start position information stored in said storage means.

3. A reproduction apparatus according to claim 1, further comprising second storage means for storing said resume mode, wherein said control means stores the resume mode in said second storage means on the basis of an operation of said operation means and reads said resume mode from said second storage means when a reproduction of said data file is started.

4. A reproduction apparatus according to claim 1, further comprising second operation means by which a user instructs the stopping of a reproduction of said data file, wherein said control means causes said playback means to be stopped when stopping of a reproduction is instructed by said second operation means by a user, and stores, in said storage means, the recording position in said recording medium of the data file which is being played back when stopping of the reproduction is instructed by said second operation means on the basis of said management information.

5. A reproduction apparatus according to claim 4, wherein said resume mode starts a reproduction from the beginning of the data file which is being played back when stopping of the reproduction of the data file is instructed by said second operation means.

6. A reproduction apparatus according to claim 4, wherein in a case where stopping of a reproduction is instructed by said second operation means, said control means further stores, in said storage means, a reproduction position in the data file which is being played back when stopping of the reproduction is instructed by said second operation means.

7. A reproduction apparatus according to claim 6, wherein said resume mode starts a reproduction from the reproduction position of a data file which is being played back when stopping of a reproduction of the data file is instructed by said second operation means on the basis of the stored content of said storage means.

8. A reproduction apparatus according to claim 1, wherein when the reproduction of said predetermined data file is stopped in the middle thereof, said operation means is able to select a first resume mode which performs a reproduction from the beginning of a predetermined data file, and a second resume mode which performs a reproduction on the basis of the position at which the reproduction of said predetermined data file was stopped.

9. A reproduction apparatus according to claim 1, wherein said management information is a table of contents (TOC).

10. A recording and reproduction apparatus for performing a resume reproduction such that a data file is recorded in a recording medium in which a plurality of data files can be recorded together with management information, and a reproduction is started from a predetermined position of a predetermined data file after the data file is recorded in said recording medium, said recording and reproduction apparatus comprising:
  recording means for recording a data file in said recording medium;
  operation means by which a user selects a predetermined resume mode from a plurality of resume modes, each of which instructs starting of a reproduction from a different reproduction start position in accordance with a reproduction start instruction after the recording is terminated;
  storage means for storing at least a part of management information of a data file which is recorded in said recording medium;
  playback means for playing back a data file which is recorded in said recording medium; and
  control means for controlling said playback means in such a way that control is performed so that a data file is recorded in said recording medium by said recording means, a part of management information for said recorded data file is stored in said storage means on the basis of a resume mode which is set by said operation means and thereafter, a resume reproduction is performed from a predetermined position of a predetermined data file on the basis of said management information stored in said storage means and the resume mode which is set by said operation means.

11. A recording and reproduction apparatus according to claim 10, further comprising second storage means for storing said resume mode, wherein said control means stores the resume mode in said second storage means on the basis of an operation of said operation means by a user, and reads said resume mode from said second storage means when the reproduction of said data file is started.

12. A recording and reproduction apparatus according to claim 10, further comprising second operation means by which a user instructs stopping of the recording of said data file, wherein when stopping of the recording is instructed by said second operation means, said control means stops said recording means and stores, in said storage means, a part of the management information of the data file which is being recorded when stopping of the recording is instructed by said second operation means.

13. A recording and reproduction apparatus according to claim 12, wherein said resume mode starts a reproduction from the beginning of a data file which is recorded first from among one or plural data files which are recorded continuously.

14. A recording and reproduction apparatus according to claim 12, wherein said resume mode starts a reproduction from near the end position of a data file which is being recorded when stopping of the recording of the data file is instructed by said second operation means.

15. A recording and reproduction apparatus according to claim 10, wherein in a case where the recording of a predetermined data file is stopped, said operation means is able to select a first resume mode which performs a reproduction on the basis of the recording end position of said predetermined data file, and a second resume mode which performs a reproduction from the beginning of a data file which is recorded first from among one or plural data files which are recorded continuously.

16. A recording and reproduction apparatus according to claim 10, wherein said management information is a table of contents (TOC).

17. A reproduction method for performing a resume reproduction which starts a reproduction from a predetermined position of a predetermined data file on the basis of a stored content of storage means for storing reproduction start position information regarding the position at which a reproduction is started from a recording medium in which one or plural data files are managed and stored in accordance with management information, said reproduction method comprising the steps of:
  selecting a predetermined resume mode in accordance with instructions from a user from a plurality of resume modes, each of which starts a reproduction from a different reproduction start position in accordance with a reproduction start instruction after the reproduction is stopped; and
  reading and playing back a data file from a predetermined position of a predetermined data file on the basis of a resume mode which is selected from said plurality of resume modes, reproduction start position information stored in said storage means, and said management information.

18. A reproduction method according to claim 17, prior to said playback step, further comprising a step of determining whether or not reproduction start position information is stored in said storage means, wherein when it is determined in said determination step that the reproduction start position information is stored in said storage means, a playback step is performed.

19. A reproduction method according to claim 17, in a case where a stopping instruction by a user is received while a data file is being played back, further comprising the steps of:

stopping the reproduction of the data file and obtaining, from a part of said management information, management information for the data file which is being played back when said stopping instruction by the user is received; and storing said obtained position information, as reproduction start position information, in said storage means.

20. A reproduction method according to claim 17, wherein said reproduction start position information is at least a part of said management information for specifying a recording position in said recording medium of a predetermined data file.

21. A reproduction method according to claim 20, wherein said reproduction start position information is a reproduction start position in said predetermined data file.

22. A reproduction method according to claim 21, wherein said reproduction start position in said predetermined data file is a position in a data file which is being played back when a reproduction stopping instruction is given by a user.

23. A reproduction method according to claim 17, wherein a resume reproduction which reads and plays back said data file is performed from the beginning of the data file which is stored in said reproduction start position information.

24. A reproduction method according to claim 17, wherein a resume reproduction which reads and plays back said data file is performed on the basis of the stopped position in the data file which is being played back when a reproduction stopping instruction is given by a user.

25. A reproduction method according to claim 17, wherein in a case where the reproduction is stopped in the. middle of the predetermined data file, said resume mode selection step is able to select a first resume mode which performs a reproduction from the beginning of said predetermined data file, and a second resume mode which performs a reproduction on the basis of the position at which the reproduction of said predetermined data file was stopped.

26. A recording and reproduction method for performing a resume reproduction such that a data file is recorded in a recording medium in which a plurality of data files can be recorded together with management information, and a reproduction is performed from a predetermined position in a predetermined data file on the basis of the contents of storage means in which a part of said management information is stored after the data file is recorded in said recording medium, said recording and reproduction method comprising:

a selection step for selecting a predetermined resume mode in accordance with instructions from a user from among a plurality of resume modes, each of which instructs starting of a reproduction from a different reproduction start position in accordance with a reproduction start instruction after the recording is stopped;

a recording step for recording an input data file in said recording medium;

a storing step for storing, in said storage means, a part of management information for managing data files which are recorded in said recording medium; and a reproducing step for playing back a data file from said recording medium in such a way that a resume reproduction is performed from a predetermined position of a predetermined data file on the basis of a part of said management information stored in said storage means and the resume mode selected from among said plurality of resume modes.

27. A recording and reproduction method according to claim 26, wherein a part of the management information to be stored in said storage means is selected on the basis of the set resume mode.

28. A recording and reproduction method according to claim 26, wherein the reproduction start position of said data file to be played back is the beginning portion of the data file which is recorded first from among data files which are recorded continuously.

29. A recording and reproduction method according to claim 26, wherein the reproduction start position of said data file to be played back is near the recording end position of the data file which is recorded last.

30. A recording and reproduction method according to claim 26, wherein in a case where the recording of a predetermined data file is stopped, said resume mode selection step is able to select a first resume mode which starts a reproduction on the basis of the recording end position of said predetermined data file, and a second resume mode which starts a reproduction from the beginning of the data file which is recorded first from among one or plural data files which are recorded continuously.

\* \* \* \* \*